(12) United States Patent
Cheung et al.

(10) Patent No.: US 6,646,776 B1
(45) Date of Patent: Nov. 11, 2003

(54) SUPPRESSION OF HIGH FREQUENCY RESONANCE IN AN ELECTRO-OPTICAL MODULATOR

(75) Inventors: Steve Cheung, Storrs, CT (US); Karl Kissa, Simsbury, CT (US); Gregory J. McBrien, Cromwell, CT (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/065,833

(22) Filed: Nov. 23, 2002

(51) Int. Cl.[7] .................................................. G02F 1/03

(52) U.S. Cl. ........................................... 359/254; 385/8

(58) Field of Search ................................ 359/254, 255, 359/315; 385/2, 8

(56) References Cited

U.S. PATENT DOCUMENTS

| | | |
|---|---|---|
| 5,455,876 A | 10/1995 | Hopfer et al. |
| 5,619,607 A | 4/1997 | Djupsjobacka |
| 6,310,700 B1 * | 10/2001 | Betts ............................. 359/2 |

OTHER PUBLICATIONS

Hopfer et al., A Novel, Wideband, Lithium Niobate Electrooptic Modulator, Journal Of Lightwave Technology, Jan. 1998, pp. 73–77, Vol. 16, No. 1.

* cited by examiner

Primary Examiner—Scott J. Sugarman
Assistant Examiner—Richard Hanig
(74) Attorney, Agent, or Firm—Kurt Rauschenbach; Rauschenbach Patent Law Group, LLC

(57) ABSTRACT

The invention relates to apparatus and methods for suppressing high frequency resonance in an electro-optical device. The electro-optical device includes an optical waveguide formed in the upper surface of a substrate. The device further includes a plurality of electrically floating electrode segments that are positioned on the substrate to intensify an electric field in the optical waveguide. The device also includes a plurality of electrically grounded electrode segments that are positioned on the substrate for prohibiting modal conversion and propagation of high order modes in the plurality of electrically grounded electrode segments and in the plurality of electrically floating electrode segments, thereby suppressing modal coupling to the substrate. The device further includes a buffer layer formed on the upper surface of the substrate and a driving electrode formed on an upper surface of the buffer layer for receiving an RF signal that induces the electric field in the optical waveguide.

26 Claims, 7 Drawing Sheets

SUPPRESSION OF HIGH FREQUENCY RESONANCE IN AN ELECTRO-OPTICAL MODULATOR

BACKGROUND OF INVENTION

In the information age, the demand for data networks of higher and higher data capacities, at lower and lower costs is constantly increasing. This demand is fueled by many different factors, such as the tremendous growth of the Internet and the World Wide Web. The increasing numbers of on-line users of the Internet and the World Wide Web have greatly increased the demand for bandwidth. For example, Internet video clips require a large amount of data transfer bandwidth.

Optical fiber transmission has played a key role in increasing the bandwidth of telecommunications networks. Optical fiber offers much higher bandwidths than copper cable and is less susceptible to various types of electromagnetic interferences and other undesirable effects. As a result, optical fiber is the preferred medium for transmission of data at high data rates and over long distances.

In optical fiber communication systems, data is transmitted as light energy over optical fibers. The data is modulated on an optical light beam with an optical modulator. Optical modulators modulate the amplitude or the phase of the optical light beam. Direct optical modulators modulate the optical wave as it is generated at the source. External optical modulators modulate the optical wave after it has been generated by an optical source.

One type of external modulator is an electro-optic interferometric modulator, such as a Mach-Zehnder interferometric (MZI) modulator, that is formed on a X-cut or Z-cut lithium niobate substrate. A MZI modulator is a dual waveguide device that is well known in the art. In operation, an electromagnetic signal, such as a RF or microwave signal, interacts with an optical signal in one of the waveguides over a predetermined distance that is known as the interaction distance. The RF signal propagates in a coplanar waveguide (CPW) mode.

Typical high-speed electro-optical external modulators use a traveling-wave electrode structure to apply the RF signal. Such modulators have a RF transmission line in the vicinity of the optical waveguide. The RF signal and the optical signal co-propagate over an interaction distance, thereby acquiring the required optical modulation. The bandwidth of such structures is limited by a phenomenon known as "walk off," which occurs when an electrical signal and an optical signal propagate with different velocities or group velocities.

A number of solutions have been suggested to limit "walk off" or to match the velocity of the optical signal to the velocity of the RF signal. One method of velocity matching the RF signal to the optical signal is to include a buffer layer on the top surface of the substrate that increases the propagation velocity of the RF signal to a velocity that is closer to the propagation velocity of the optical signal. Another method of reducing velocity mismatch between the RF signal and the optical signal is to decrease the interaction distance. Decreasing the interaction distance, however, requires an increase in the electric field that is required to obtain a suitable phase shift in the optical signal.

A method of reducing velocity mismatch between the microwave modulation signal and the optical signal propagating in the waveguide includes providing a buffer layer that has approximately the same effective dielectric constant as the optical waveguide and also introducing electrically floating electrodes between RF electrodes and the substrate to maximize the electric field across the waveguide.

However, such a structure may induce undesired longitudinal current in the ground electrodes that are electromagnetically coupled to the electrically floating electrodes. This undesired longitudinal current can negatively impact the performance of the modulator. For example, the undesired longitudinal current can result in coupled modes being created in the ground electrodes and in the electrically floating electrodes. The undesired longitudinal current can also result in conversion of the CPW mode to higher order modes in the ground electrodes and in the electrically floating electrodes. This modal coupling and modal conversion can lead to high frequency loss in the substrate, which can degrade modulator performance at high frequencies.

SUMMARY OF INVENTION

An electro-optic modulator according to the present invention uses an improved floating electrode mechanism for extending the electro-optic bandwidth of the optical device. An electro-optic modulator according to the present invention has relatively high bandwidth and does not experience high frequency loss that occurs in prior art modulators having known floating electrode structures.

An electro-optic modulator according to the present invention includes a plurality of electrodes that are segmented and coupled to ground. These electrodes substantially prevent the formation and propagation of high-order modes in the plurality of electrically grounded electrode segments and the plurality of electrically floating electrode segments. This substantially suppresses modal coupling to the substrate, thereby reducing the insertion loss in the optical waveguide and extending the electro-optic bandwidth of the device.

Accordingly, in one aspect the present invention is embodied in an electro-optic device, such as a Mach-Zehnder interferometric modulator, that includes a lithium niobate substrate having an optical waveguide that is formed in an upper surface of the substrate. In one embodiment of the invention, the lithium niobate substrate is cut perpendicular to the X-axis (X-cut lithium niobate). In another embodiment of the invention, the lithium niobate substrate is cut perpendicular to the Z-axis (lithium niobate).

The electro-optic device also includes a plurality of electrically floating electrode segments that are positioned on the substrate. The plurality of electrically floating electrode segments are adapted to intensify an electric field in the optical waveguide.

The electro-optic device also includes a plurality of electrically grounded electrode segments that are positioned on the substrate. The electrically grounded electrode segments substantially prohibit modal conversion and propagation of high order modes in the plurality of electrically grounded electrode segments and the plurality of electrically floating electrode segments by substantially interrupting the continuity of induced electrical current in the plurality of electrically grounded electrode segments. This substantially reduces high frequency loss in the substrate.

In one embodiment, each of the plurality of electrically grounded electrode segments is separated from an adjacent one of the plurality of electrically grounded electrode segments by a predetermined distance. In one embodiment, the predetermined distance is chosen so as to substantially suppress modal coupling to the substrate and propagation of higher order modes including one or more substrate modes in the plurality of electrically grounded electrode segments and the plurality of electrically floating electrode segments. In one embodiment, the predetermined distance is chosen so as increase or to maximize suppression of modal coupling to the substrate.

A buffer layer that comprises a dielectric material is formed directly on the upper surface of the lithium niobate substrate. In one embodiment, the buffer layer includes BCB dielectric material. In another embodiment, the buffer layer includes a $SiO_2$ dielectric material. In another embodiment, the buffer layer includes a $TF_4$ dielectric material. In another embodiment, the buffer layer includes a semiconductor material. In one embodiment, the buffer layer has a thickness that is less than ten microns.

The electro-optic device also includes a driving electrode that is formed on the buffer layer. The driving electrode is adapted to receive an RF signal that induces an electric field in the optical waveguide.

In another aspect, the present invention is embodied in a method for suppressing modal coupling to a substrate of an electro-optic device. The method includes inducing an electric field in an optical waveguide by applying an RF signal to a driving electrode. The method also includes intensifying the electric field in the optical waveguide by positioning a plurality of electrically floating electrode segments and electrically grounded electrode segments proximate to the optical waveguide.

The method further includes interrupting a continuity of induced electrical current in the plurality of electrically grounded electrode segments. This substantially prohibits modal conversion and propagation of high order modes in the plurality of electrically grounded electrode segments and the plurality of electrically floating electrode segments. In one embodiment, the interrupting the continuity of induced electrical current in the plurality of electrically grounded electrode segments includes positioning the plurality of electrically grounded electrode segments proximate to the plurality of electrically floating electrode segments. By interrupting the continuity of induced electrical current in the plurality of electrically grounded electrode segments, the method substantially suppresses modal coupling to the substrate, which reduces insertion loss in the electro-optic device.

In one embodiment, each of the plurality of electrically grounded electrode segments is separated from an adjacent one of the plurality of electrically grounded electrode segments by a predetermined distance. In one embodiment, the predetermined distance is chosen so as to substantially prohibit modal conversion and propagation of higher order modes including one or more substrate modes in the plurality of electrically grounded electrode segments. In one embodiment, the predetermined distance is chosen so as minimize high frequency loss in the substrate.

In one embodiment, the method further includes positioning at least one of the plurality of electrically floating electrode segments a distance from an adjacent one of the plurality of electrically grounded electrode segments so as to substantially modal conversion and propagation of high order modes including one or more substrate modes in the plurality of electrically grounded electrode segments and the plurality of electrically floating electrode segments. In one embodiment, the method further includes positioning at least one of the plurality of electrically grounded electrode segments a distance from an adjacent one of the plurality of electrically grounded electrode segments so as to increase or to maximize suppression of modal coupling to the substrate.

In one aspect, the present invention is embodied in an electro-optic modulator such as a Mach-Zehnder optical modulator. The modulator includes a substrate. A first and a second optical waveguide are formed in an upper surface of the substrate. The modulator also includes a plurality of electrically floating electrode segments that are positioned on the substrate. The plurality of electrically floating electrode segments intensifies the electric field in the first and the second optical waveguides.

The modulator further includes a plurality of electrically grounded electrode segments that are positioned on the substrate. The plurality of electrically grounded electrode segments substantially prohibits modal conversion and propagation of high order modes in the plurality of electrically grounded electrode segments and the plurality of electrically floating electrode segments, which suppresses modal coupling to the substrate. In one embodiment, each of the plurality of electrically grounded electrode segments is separated from an adjacent one of the plurality of electrically grounded electrode segments by a predetermined distance. The predetermined distance is chosen so as to substantially prohibit modal conversion and propagation of higher order modes including one or more substrate modes in the plurality of electrically grounded electrode segments and the plurality of electrically floating electrode segments. In one embodiment, the predetermined distance is chosen so as to increase or to maximize suppression of modal coupling to the substrate.

A buffer layer is formed on top of the substrate, the plurality of electrically floating electrode segments, and the plurality of electrically grounded electrode segments. The buffer layer can be a dielectric material, such as a BCB dielectric material, a $TF_4$ or a silicon dioxide dielectric material. The buffer layer can also be a semiconductor material.

The modulator includes a driving electrode that is formed on the buffer layer. The driving electrode is adapted to receive a microwave or a radio-frequency (RF) signal from an RF input. The RF signal induces an electric field in the first and the second optical waveguides. In one embodiment, the modulator also includes an optical source for providing the optical signal to the first and the second optical waveguides.

In one aspect, the invention is embodied in a method for modulating an optical signal. The method includes inducing an electric field in a first and a second optical waveguide by applying an RF signal to a driving electrode. The method further includes intensifying the electric field in the first and the second optical waveguides by positioning a plurality of electrically floating electrode segments and a plurality of electrically grounded electrode segments proximate to the first and the second optical waveguides.

The method also includes interrupting a continuity of an induced electrical current in the plurality of electrically grounded electrode segments. This substantially prohibits modal conversion and propagation of high order modes in the plurality of electrically grounded electrode segments and the plurality of electrically floating electrode segments. In one embodiment, the interrupting of the continuity of the induced electrical current in the plurality of electrically grounded electrode segments substantially suppresses modal coupling to the substrate, thereby reducing insertion loss in the electro-optic device.

In one embodiment, the interrupting of the continuity of the induced electrical current in the plurality of electrically grounded electrode segments includes positioning the plurality of electrically grounded electrode segments proximate to the plurality of electrically floating electrode segments. In one embodiment, each of the plurality of electrically grounded electrode segments is separated from an adjacent one of the plurality of electrically grounded electrode segments by a predetermined distance. The predetermined distance is chosen so as to substantially prohibit modal conversion and propagation of higher order modes including one or more substrate modes in the plurality of electrically grounded electrode segments and the plurality of electrically floating electrode segments. In one embodiment, the predetermined distance is chosen so as increase or to maximize suppression of modal coupling to the substrate.

In one embodiment, the method further includes positioning at least one of the plurality of electrically floating electrode segments a distance from an adjacent one of the plurality of electrically grounded electrode segments so as to prohibit modal conversion and propagation of high order modes in the plurality of electrically grounded electrode segments and the plurality of electrically grounded electrode segments.

BRIEF DESCRIPTION OF DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
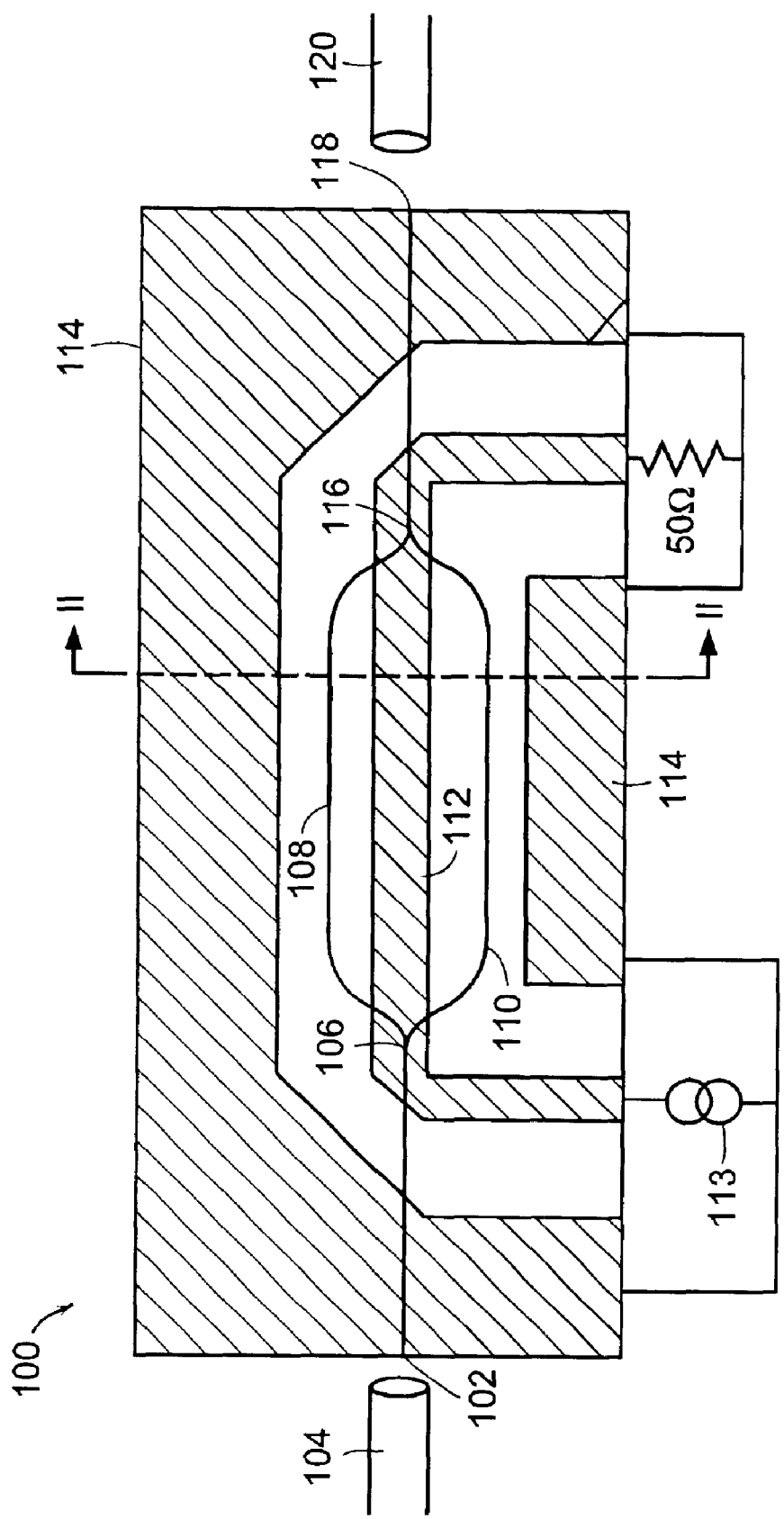
FIG. 1 is a top planar view of a floating electrode Mach-Zehnder interferometric modulator according to one embodiment of the present invention.

Referring to the drawings, FIG. 1 illustrates a top planar view of a floating electrode Mach-Zehnder interferometric (MZI) modulator 100 according to the present invention. Although the present invention is described herein with reference to a Mach-Zehnder modulator, the invention can be used with any type of electro-optical device. The modulator 100 includes an optical input 102 that is optically coupled to an optical waveguide, such as an input optical fiber 104. The input optical fiber 104 provides an incident optical signal from an optical source such as a laser diode (not shown).

An optical splitter 106, such as a Y-junction, splits the incident optical signal into a first 108 and a second optical waveguide 110 that form a first and a second arm of the MZI modulator 100. In one embodiment, the optical waveguides 108, 110, each have a width of approximately seven (7) microns and are approximately three (3) microns thick. In one embodiment, the optical waveguides 108, 110 are formed in a lithium niobate ($LiNBO_3$) substrate (not shown). An RF driving electrode 112 is proximately positioned to the first 108 and the second optical waveguides 110. The RF driving electrode 112 is electrically coupled to an RF signal generator 113. RF ground electrodes 114 are proximately positioned to the RF driving electrode 112 and to the first 108 and the second optical waveguides 110.

An optical combiner 116, such as a Y junction, combines the first 108 and the second optical waveguides 110. An optical output 118 is optically coupled to the optical combiner 116. An output optical fiber 120 is coupled to the optical output 118. The output optical fiber 120 propagates the modulated optical signal through a communication system.

The operation of MZI modulator 100 according to the present invention is similar to the operation of a typical MZI modulator. The incident optical signal propagates through the optical input 102. The optical splitter 106 splits the incident optical signal into a first and a second optical signal. The first and the second optical signals propagate through the first 108 and the second optical waveguides 110, respectively.

The RF signal generator 113 generates a coplanar waveguide mode (CPW) signal. The CPW signal propagates through the RF driving electrode 112. The electromagnetic field generated by the RF signal is coupled to the ground electrodes 114 through the $LiNBO_3$ substrate. The electromagnetic field causes the refractive index of the substrate material to change, which changes the delay of the optical signal propagating in the first optical waveguide 108 relative to the second optical waveguide 110.

Figure 2:
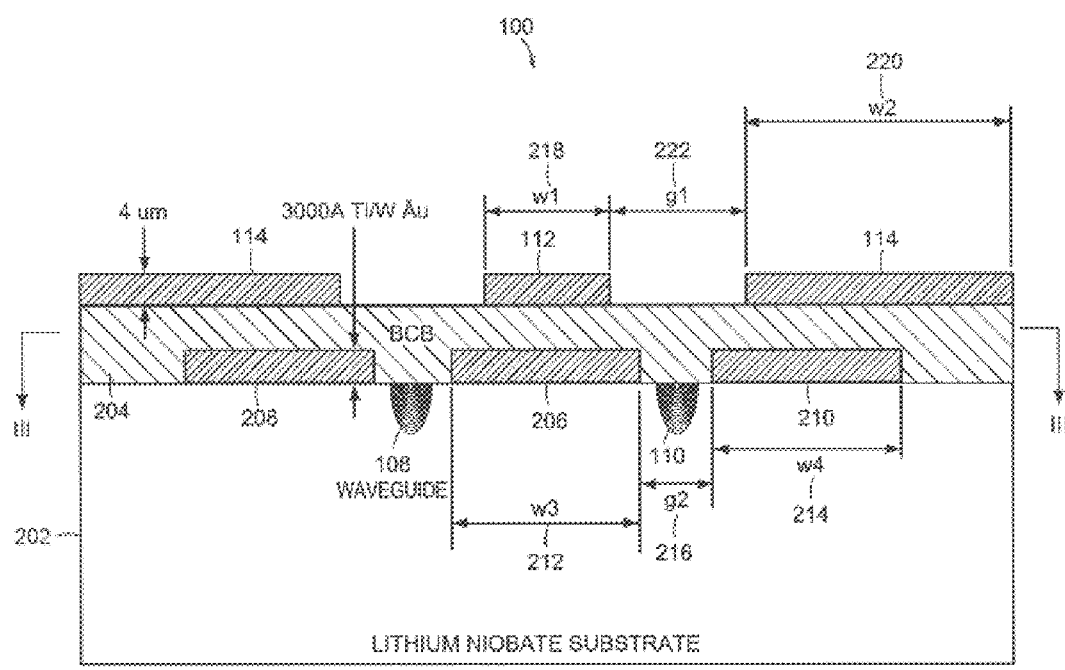
FIG. 2 is a cross-sectional view of the floating electrode Mach-Zehnder interferometric modulator of FIG. 1 taken along line II—II.

FIG. 2 illustrates a cross-sectional view of the floating electrode MZI modulator 100 of FIG. 1 taken along line II—II. In one embodiment, the modulator 100 includes a substrate 202 that is formed from X-cut lithium niobate ($LiNbO_3$). The substrate 202, for example, could be approximately 1000 microns ($\mu$m) thick. In order to maximize modulation efficiency, the first 108 and second waveguides 110 are positioned between the RF electrode 112 and the RF ground electrodes 114 for an X-cut substrate.

In another embodiment (not shown), the substrate 202 is formed from Z cut $LiNbO_3$. In this embodiment, in order to increase or to maximize modulation efficiency, the first 108 and second waveguides 110 are positioned under the RF electrode 112 and the RF ground electrodes 114. The length and width of the substrate 202 depends on various modulator design parameters. In other embodiments, any type of electro-optic material can be used with the floating electrode MZI modulator 100 of the present invention.

In one embodiment, the first 108 and second optical waveguides 110 are formed by diffusing titanium into the substrate 202 material. The first 108 and second optical waveguides 110 can, for example, be approximately seven (7) microns wide and approximately three (3) microns deep.

The floating electrode MZI modulator 100 of the present invention also includes a plurality of electrically floating electrode segments 206. The plurality of electrically floating electrode segments 206 is positioned on an upper surface of the substrate 202 proximate to the first 108 and the second optical waveguides 110. In one embodiment, the plurality of electrically floating electrode segments 206 is disposed on the substrate 202 and positioned between the first 108 and the second optical waveguides 110.

The electrically floating electrode segments 206 are electrically floating in that they are not directly coupled to the RF driving electrode 112, the RF ground electrodes 114, or the RF signal generator 113 (FIG. 1). In one embodiment, each of the plurality of electrically floating electrode segments 206 is formed directly on the substrate 202. The plurality of electrically floating electrode segments 206 can be formed from an electrically conducting material, such as gold. Other conductive metal or metal alloys can also be used. Electroplating or sputtering techniques can also be used to form the plurality of electrically floating electrode segments 206. In one embodiment, a fifty (50) to eighty (80) Angstrom layer (not shown) of titanium or titanium/tungsten is deposited to improve the adhesion of the gold to the substrate 202.

The electrically floating electrode segments 206 are used to reduce the interaction distance of the electromagnetic field. The reduction in the interaction distance maximizes the voltage across the first 108 and the second optical waveguides 110, thereby intensifying the electric field in the first 108 and the second optical waveguides 110. In addition, the reduction in the interaction distance reduces the size and the power requirements of the MZI modulator 100.

In order to reduce the interaction distance of the electromagnetic field, the plurality of electrically floating electrode segments 206 require that a ground electrode be positioned proximate to the electrically floating electrode segments 206 in order to couple the field to the ground electrode. However, as previously discussed, known floating electrode modulators can exhibit undesired longitudinal currents in the ground electrodes. These undesired longitudinal currents can lead to the propagation of high order modes including one or more substrate modes in the ground electrodes and the electrically floating electrodes. The propagation of these high order modes can cause modal coupling to the substrate, resulting in higher insertion loss and degraded modulator performance at frequencies greater than approximately twenty-five gigahertz (25 GHz).

Accordingly, one embodiment of the invention utilizes electrically grounded electrode segments positioned on the substrate. The electrically grounded electrode segments substantially prohibit the propagation of high order modes including one or more substrate modes in the electrically grounded electrode segments and the electrically floating electrode segments by suppressing modal resonance and introducing cutoff to the one or more substrate modes. In one embodiment, the suppression of modal resonance substantially reduces high frequency loss in the substrate due to substrate mode coupling and conversion of the CPW mode to higher order modes in the electrically grounded electrode segments and the electrically floating electrode segments.

Thus, the MZI modulator 100 also includes a first plurality of electrically grounded electrode segments 208 and a second plurality of electrically grounded electrode segments 210 disposed on the upper surface of the substrate 202 proximate to the plurality of floating electrode segments 206. In one embodiment, the first 208 and the second plurality of electrically grounded electrode segments 210 are formed from gold. In other embodiments, other conductive metal or metal alloys are used. Electroplating or sputtering techniques can also be used to form the first 208 and the second plurality of electrically grounded electrode segments 210. In one embodiment, a fifty (50) to eighty (80) Angstrom layer (not shown) of titanium or titanium/tungsten is deposited to improve the adhesion of the gold to the substrate 202.

In one embodiment, the plurality of electrically floating electrode segments 206 and the first 208 and the second plurality of electrically grounded electrode segments 210 are segmented strips of metal or metal alloy. The first 208 and the second plurality of electrically grounded electrode segments 210 are coupled to electrical ground. This coupling can be achieved by wire bonding the first 208 and the second plurality of electrically grounded electrode segments 210 to the electrical ground or by other techniques known to skilled artisans. The segmentation and grounding of the floating electrodes will be discussed in more detail with reference to FIGS. 3A and 3B.

The electrically floating electrode segments 206 and the first 208 and the second electrically grounded electrode segments 210 increase the shunt capacitance between the RF electrodes 112, 114. In another embodiment, the electrically floating electrode segments 206 and the first 208 and the second electrically grounded electrode segments 210 are situated substantially parallel to the optical waveguides 108 and 110 in the MZI modulator 100. For example, the width w3 212 of the plurality of electrically floating electrode segments 206 can be approximately eighty (80) microns and the width w4 214 of the first 208 and the second electrically grounded electrode segments 210 can be approximately three hundred (300) microns. In one embodiment, there is approximately a ten (10) to twelve (12) micron gap g2 216 between the electrically floating electrode segments 206 and each of the first 208 and the second electrically grounded electrode segments 210. Note that for illustrative purposes, FIG. 2 is not drawn to scale.

In one embodiment, the total length of each of the pluralities of electrode segments 206, 208, 210 is approximately the same length as the interaction distance. The optical waveguides 108 and 110 are situated at least partially within the substrate 202 and substantially within the gaps between the electrically floating electrode segments 206 and the first 208 and the second electrically grounded electrode segments 210. In one embodiment, each of the pluralities of electrode segments 206, 208, 210 is gold (Au). In one embodiment, each of the pluralities of electrode segments 206, 208, 210 includes a layer of titanium/tungsten (Ti/W) and a layer of gold (Au). Each of the pluralities of electrode segments 206, 208, 210 is preferably vacuum deposited to a thickness of approximately 3000 angstroms. In one embodiment, a thin layer of titanium is used to improve the adhesion of each of the pluralities of electrode segments 206, 208, 210 to the substrate 202.

A buffer layer 204 with a dielectric constant ($\in$) is deposited over the substrate 202, the electrically floating electrode segments 206, the first 208 and the second electrically grounded electrode segments 210, and the first 108 and the second optical waveguides 110. The substrate 202 has a dielectric constant ($\in$) that is higher than the dielectric constant ($\in$) of the buffer layer 204. In one embodiment, the RF driving electrode 110 and the RF ground electrode 112 are electroplated over the buffer layer 204. The buffer layer 204 creates a medium for the RF signals that has substantially the same effective dielectric constant as the medium in which the optical signals travel. Thus, the velocity of the RF signals increases since the effective dielectric constant of the medium is reduced. This results in substantially matching the velocity of the RF signals to the velocity of the optical signals.

In one embodiment, the buffer layer 204 includes a dielectric material. The dielectric material can include silicon dioxide ($SiO_2$). The dielectric material can include $TF_4$. In one embodiment, the buffer layer 204 includes a semiconductor material. In one embodiment, the buffer layer 204 includes a polymer layer of Benzocyclobutene (BCB) 3022. BCB 3022 is a trade name for a polymer that is manufactured by the Dow Chemical Company, and that is widely used in multichip module (MCM) technology. For example, the polymer can be made from Dow Cyclotene RTM 3022-57 Benzocyclobutene (BCB) monomer resin and Mesitylene solvent having a dielectric constant (∈) equal to 2.7. BCB has superior thermal and electrical characteristics compared with conventionally used dielectric layer materials, such as silicon dioxide ($SiO_2$). The microwave dielectric constant of BCB is only approximately 2.7, in contrast to approximately 3.9 for $SiO_2$. Furthermore, BCB is hydrophobic and absorbs less than 0.25% moisture after a 24-hour boil. In contrast, silicon dioxide is porous and absorbs a few percent of moisture after a 24-hour boil. Additionally, fabricating modulators with BCB requires only a small capital investment since only a spinner and an oven are required to apply the BCB layer.

In one embodiment, the BCB layer has a thickness that ranges from between approximately three (3) microns and ten (10) microns. For example, in one embodiment, the BCB layer is approximately 9.5 microns thick.

As previously discussed, the MZI modulator 100 further includes an RF driving electrode 112 and RF ground electrodes 114 disposed on the buffer layer 204. Although the embodiment of FIG. 2 illustrates the RF driving electrode 112 being disposed between the first 108 and the second 110 optical waveguides, skilled artisans will appreciate that the RF driving electrode 112 can be disposed in a different position relative to the first 108 and the second 110 optical waveguides. Additionally, the RF ground electrodes 114 are shown disposed symmetrically on either side of the RF driving electrode 112. However, skilled artisans will appreciate that non-symmetrical embodiments can be realized without departing from the spirit and scope of the invention.

In one embodiment, the RF driving electrode 112 and the RF ground electrodes 114 are formed from gold. In other embodiments, other conductive metal or metal alloys are used. The RF driving electrode 112 and the RF ground electrodes 114 can, for example, be formed by electroplating or sputtering techniques. In one embodiment, a fifty (50) to eighty (80) Angstrom layer (not shown) of titanium or titanium/tungsten is deposited prior to forming the RF driving electrode 112 and the RF ground electrodes 114. This layer improves the adhesion of the gold to the buffer layer 204.

The RF driving electrode 112 is connected to an RF transmission line (not shown), which delivers a RF signal having a coplanar waveguide (CPW) mode from the RF signal generator 113 (FIG. 1). In one embodiment, the RF transmission line is a coaxial cable. The RF driving electrode 112 is connected to the center conductor of the coaxial cable, which is connected to the output of the signal generator 113. The shield or outer conductor of the coaxial cable is electrically connected to the RF ground electrodes 114. For a Mach-Zehnder modulator, the thickness and width of the RF driving electrode 112 and the RF ground electrodes 114 are determined by the design of the modulator and can be determined by one of ordinary skill in the art.

In one embodiment, the width w1 218 of the center RF driving electrode 112 is approximately fifty (50) microns and the width w2 220 of the outer RF ground electrodes 114 is approximately four hundred (400) microns. The height of the RF driving electrode 112 and the RF ground electrodes 114 is approximately four (4) microns. Additionally, there is approximately a forty (40) micron gap g1 222 between the center RF driving electrode 112 and each of the outer RF ground electrodes 114.

In operation, the plurality of electrically floating electrode segments 206 and the electrically grounded electrode segments 208, 210 are used to apply the available voltage across the buffer layer 204, directly to the first 108 and the second optical waveguides 110. This results in greater electric field intensity across the first 108 and the second optical waveguides 110. Also, due to the addition of the plurality of electrically floating electrode segments 206, 208, 210, the design of the RF driving electrode 112 and the RF ground electrodes 114 is substantially independent of the dimensions of the first 108 and the second optical waveguides 110. As a result, the RF driving electrode 112 and the RF ground electrodes 114 can be designed to match the source impedance of standard signal generators (e.g., microwave sources with impedance of fifty (50) ohms). This allows the MZI modulator 100 to operate over a wide frequency band.

In other embodiments, the MZI modulator 100 includes a plurality of segmented electrodes 206, 208, and 210 that have larger dimensions that achieve lower attenuation of the microwave signal along the interaction distance and thus increase bandwidth.

Figure 3A:
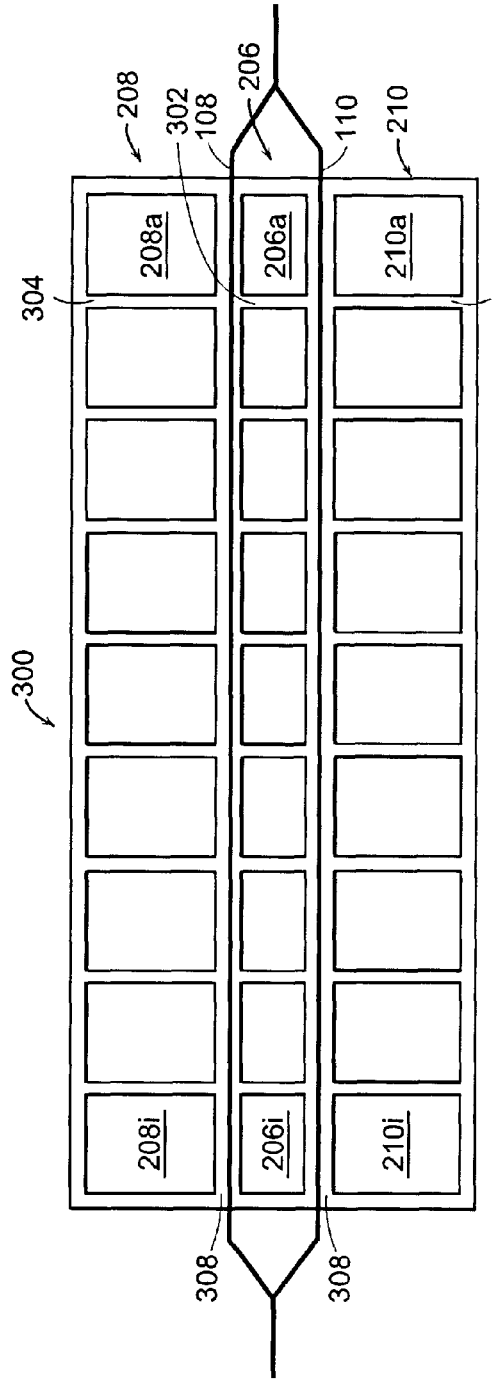
FIG. 3A is a cross-sectional view of the modulator of FIG. 2 taken along line III—III.

FIG. 3A is a cross-sectional view of the modulator 500 of FIG. 2 taken along line III—III. Specifically, FIG. 3A shows an illustrative configuration 300 of the electrically floating electrode segments 206 and the electrically grounded electrode segments 208, 210 according to one embodiment of the invention.

In one embodiment, the electrically grounded electrode segments 208, 210 are coupled to an electrical ground. The electrically grounded electrode segments 208, 210 are adapted to interrupt the continuity of induced electrical current in the electrically grounded electrode segments 208, 210. The interruption of the continuity substantially prohibits modal conversion and propagation of high order modes including one or more substrate modes in the electrically grounded electrode segments 208, 210 and the electrically floating electrode segments 206 by suppressing modal resonance and introducing cutoff to the one or more substrate modes. The segmentation of the electrically grounded electrode segments 208, 210 causes the interruption in the continuity of induced electrical current in the electrically grounded electrode segments 208, 210.

In one embodiment, the plurality of electrically floating electrode segments 206 are disposed along the length of a row that is positioned substantially parallel to the first 108 and the second optical waveguides 110 over the length of the interaction distance. In one embodiment, the segments 206a–i of the plurality of electrically floating electrode segments 206 are configured to extend over the active length of the optical waveguides 108, 110.

In one embodiment, each segment 206a–i of the plurality of electrically floating electrode segments 206 is approximately between one hundred and fifty (150) and two hundred and fifty (250) microns long and approximately eighty (80) microns wide. Each segment 206a–i is separated from an adjacent segment 206a–i by a predetermined distance or gap width 302. The gap width 302 can be varied depending on the design of the device. For example, in one embodiment, the gap width 302 is approximately ten (10)

microns for each segment. In one embodiment, the gap width 302 is the same for each segment. In other embodiments, the gap width 302 is different for two or more segments.

In one embodiment, the plurality of electrically grounded electrode segments 208, 210 are disposed in rows that are situated substantially parallel to the first 108 and the second optical waveguides 110 over the length of the interaction distance. In one embodiment, the segments 208a–i, 210a–i of the plurality of electrically grounded electrode segments 208, 210 are configured to extend over the active length of the optical waveguides 108, 110.

In one embodiment, each of the plurality of electrically grounded electrode segments 208a–i, 210a–i is approximately three-hundred (300) microns wide and between one hundred and fifty (150) and two hundred and fifty (250) microns long. Each segment 208a–i, 210a–i of the plurality of electrically grounded electrode segments is separated from an adjacent segment 208a–i, 210a–i by predetermined distances or gap widths 304, 306, respectively.

The gap widths 304, 306 can be varied depending on the design of the device. In one embodiment, the gap widths 304, 306 are the same for each segment. However, in other embodiments, the gap widths 304, 306 are different for two or more segments. Also, the gap width 304 can be different from the gap width 306. In one embodiment, the gap widths 304, 306 are approximately ten (10) microns for each segment.

In one embodiment, the gap widths 304, 306 are chosen so as to substantially prohibit the propagation of high order modes including one or more substrate modes in the plurality of electrically grounded electrode segments 208, 210 and the plurality of electrically floating electrode segments 206. In one embodiment, the gap widths 304, 306 are chosen to maximize suppression of substrate modal coupling, thereby reducing high frequency loss in the substrate 202.

In one embodiment, each of the electrically floating electrode segments 206a–i are aligned coincident with each of the corresponding electrically grounded electrode segments 208a–i, 210a. The row of electrically floating electrode segments 206 is separated from each row of electrically grounded electrode segments 208, 210 by a gap width 308 that is approximately ten (10) to twelve (12) microns. The optical waveguides 108, 110 pass between the row of electrically floating electrode segments 206 and the rows of electrically grounded electrode segments 208, 210. In one embodiment, each of the electrode segments 206a–i, 208a–i, and 210a–i is gold-plated to a thickness of three thousand (3000) angstroms.

The total length of the rows of electrode segments 206, 208, and 210 is approximately the same as the interaction distance. in one embodiment, the total length of the rows and the length of the interaction distance are approximately three (3) centimeters long.

In one embodiment, each of the plurality of electrically grounded electrode segments 208a–i, 210a–i is coupled to electrical ground in order to break down or substantially prohibit the formation and the propagation of high order modes including one or more substrate modes as well as modal conversion in the plurality of electrically grounded electrode segments 208a–i, 210a–i, and the plurality of electrically floating electrode segments 206a–i as described herein. The ground coupling can be achieved by wire bonding each of the plurality of electrically grounded electrode segments 208a–i, 210a–i to a ground plane (not shown), or by other techniques known to skilled artisans.

The ground segmentation of the segmented grounded electrodes 208, 210 prevents the induction of longitudinal currents in the electrically grounded electrode segments 208a–i, 210a–i originating from the RF signal.

Without the ground segmentation, resonance beyond 25 GHz can significantly degrade the electro-optic bandwidth due to induced longitudinal current from the RF circuitry. This induced longitudinal current can lead to the formation and propagation of high order coupled modes and modal conversion in typical modulators having non-segmented ground electrodes and electrically floating electrodes, which can lead to an increase in high frequency resonance in the substrate. This high frequency resonance results in higher insertion loss in a modulator having non-segmented ground electrodes.

In operation, the electrically floating electrode segments 206 and the electrically grounded electrode segments 208, 210 act as a high-pass filter with a cut-off frequency well above fifty (50) GHz. These segmented electrodes support only transverse currents and not longitudinal currents as part of the overall transmission line. Therefore, the electrically grounded electrode segments 208, 210 of the present invention substantially suppress any coupled modes which can be set up in the electrically grounded electrode segments 208, 210 and the electrically floating electrode segments 206.

In another embodiment, to suppress dielectric slab resonance above twenty-five (25) GHz ever further, the thickness of the LiNbO$_3$ substrate 202 (FIG. 2) can be reduced from about 1.0 millimeter to 0.5 millimeters. In one embodiment, the LiNbO$_3$ substrate 202 is approximately sixty-two (62) millimeters in length and approximately 7.5 millimeters wide in order to provide sufficient structural support for the first 108 and the second optical waveguides 110, the RF electrodes 112, 114, and the plurality of electrically floating 206 and electrically grounded electrode segments 208, 210.

Figure 3B:
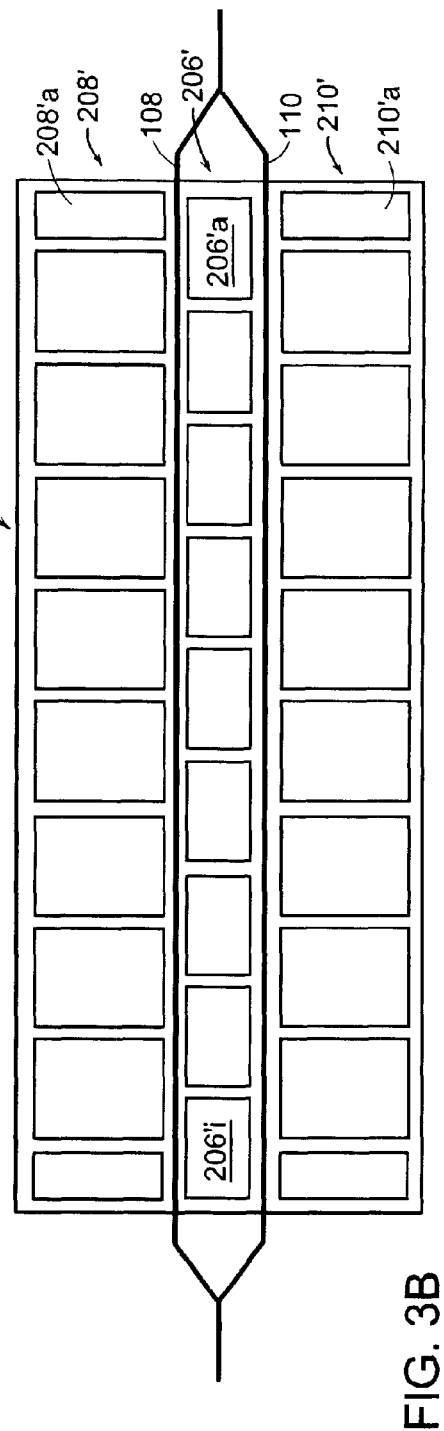
FIG. 3B is a cross-sectional view of an alternative embodiment of the modulator taken along line III—III of FIG. 2.

FIG. 3B is a cross-sectional view of another embodiment of the modulator 100 of FIG. 2 taken along line III—III. Specifically, FIG. 3B illustrates an alternative embodiment of a segmented floating electrode configuration 300'. In this embodiment, each of the electrically floating electrode segments 206'a–i is offset from each of the electrically grounded electrode segments 208'a–d, 210'a–i. For example, in one embodiment, the amount of the offset is approximately one-half of the length of one segment 206'a. Skilled artisans will appreciate that the alternative configurations for the floating electrode segments can be created without departing from the spirit and scope of the invention.

Figure 4:
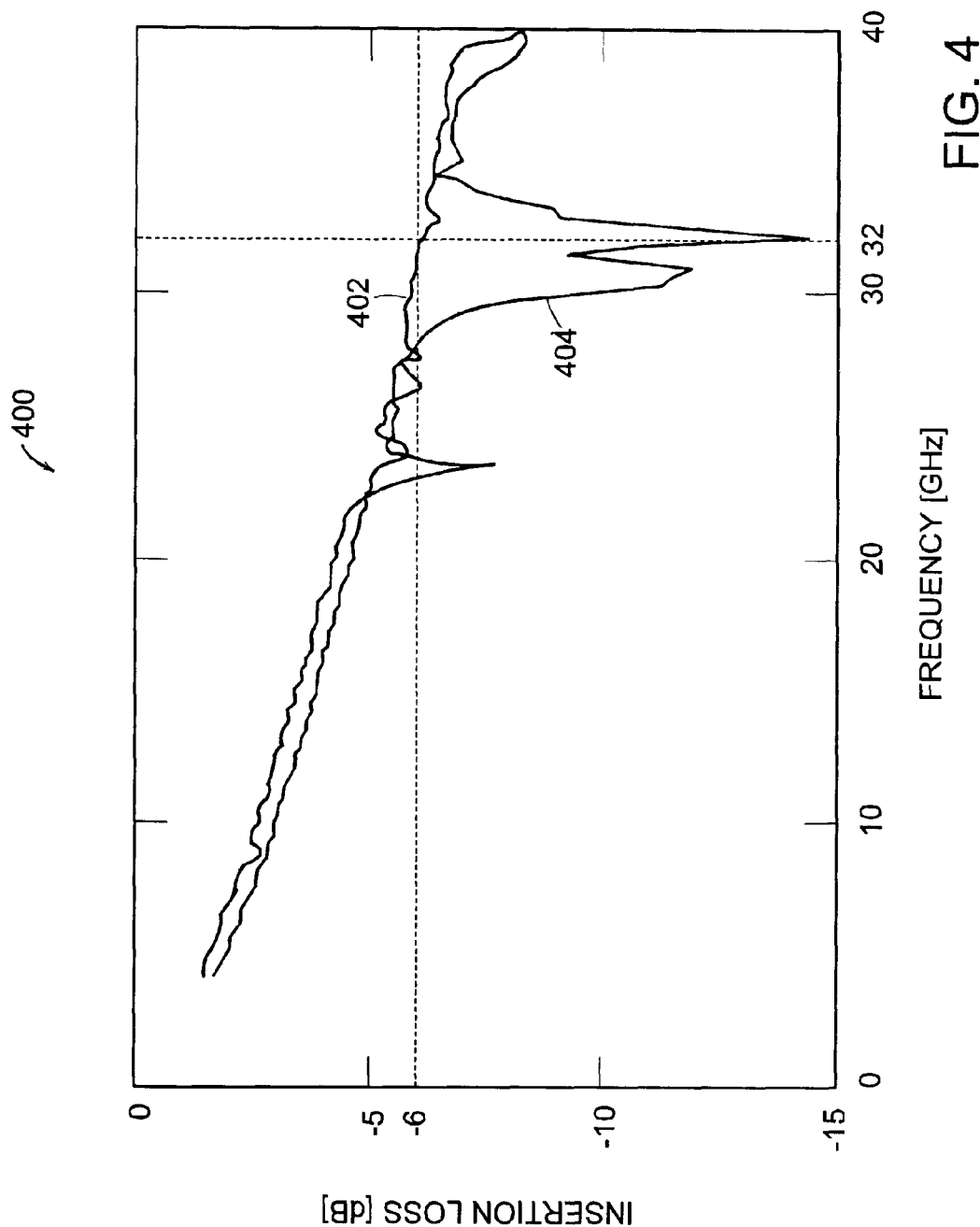
FIG. 4 is a graphical representation of a comparison of insertion loss in decibels as a function of frequency for a floating electrode modulator having segmented electrically grounded electrodes according to the present invention and a floating electrode modulator having non-segmented electrically grounded electrodes.

FIG. 4 is a graphical representation 400 of a comparison of insertion loss in decibels as a function of frequency for a floating electrode modulator having electrically grounded electrode segments according to the present invention and a typical floating electrode modulator having non-segmented electrically grounded electrodes. Specifically, the graph 402 depicts the insertion loss for the floating electrode modulator 100 having the electrically grounded electrode segments 208, 210 coupled to ground. The graph 404 depicts a typical floating electrode modulator having non-segmented electrically grounded electrodes. Graph 404 shows undesirable high frequency resonance between 30 GHz and 35 GHz.

Surface waves associated with the non-segmented electrically grounded electrodes are coupled into the LiNbO$_3$ substrate causing the high frequency resonance illustrated in the graph 404. This surface mode coupling is effectively suppressed through the use of electrically grounded electrode segments 208, 210 as taught by the present invention.

Figure 5:
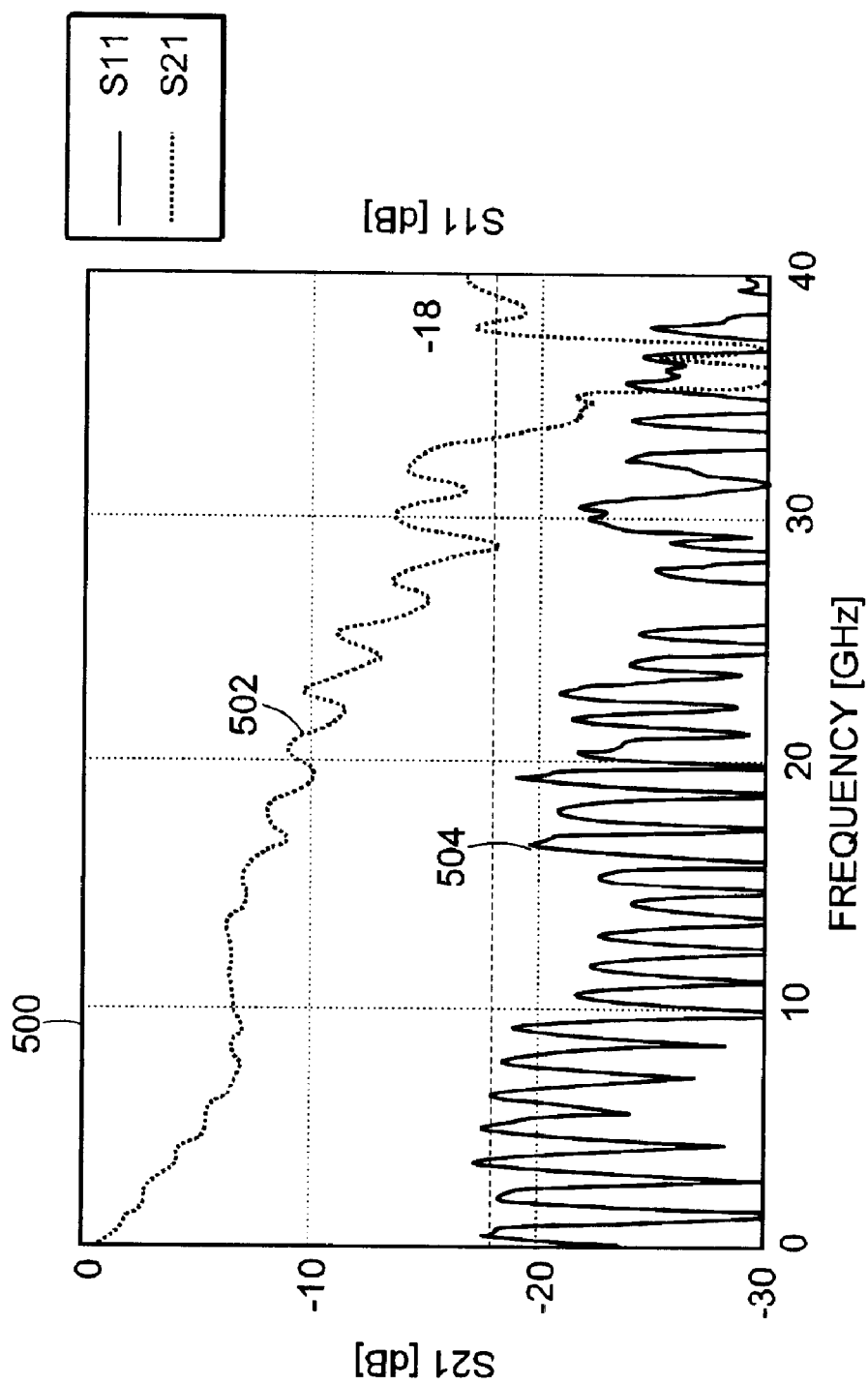
FIG. 5 graphically illustrates S parameters for a prior art electro-optical modulator that does not include the electrically grounded electrode segments of the present invention.

FIG. 5 graphically illustrates S-parameters 500 for a prior art electro-optical modulator that does not include the electrically grounded electrode segments of the present invention. The S-parameters 500 are illustrated for a prior art modulator that includes non-segmented continuous ground electrodes which interact with an electrically floating electrode. FIG. 5 illustrates the insertion loss (s21) characteristic 502 in decibels as a function of frequency for the prior art device. The insertion loss (s21) characteristic 502 illustrates relatively high insertion loss at frequencies above 25 GHz.

Figure 6A:
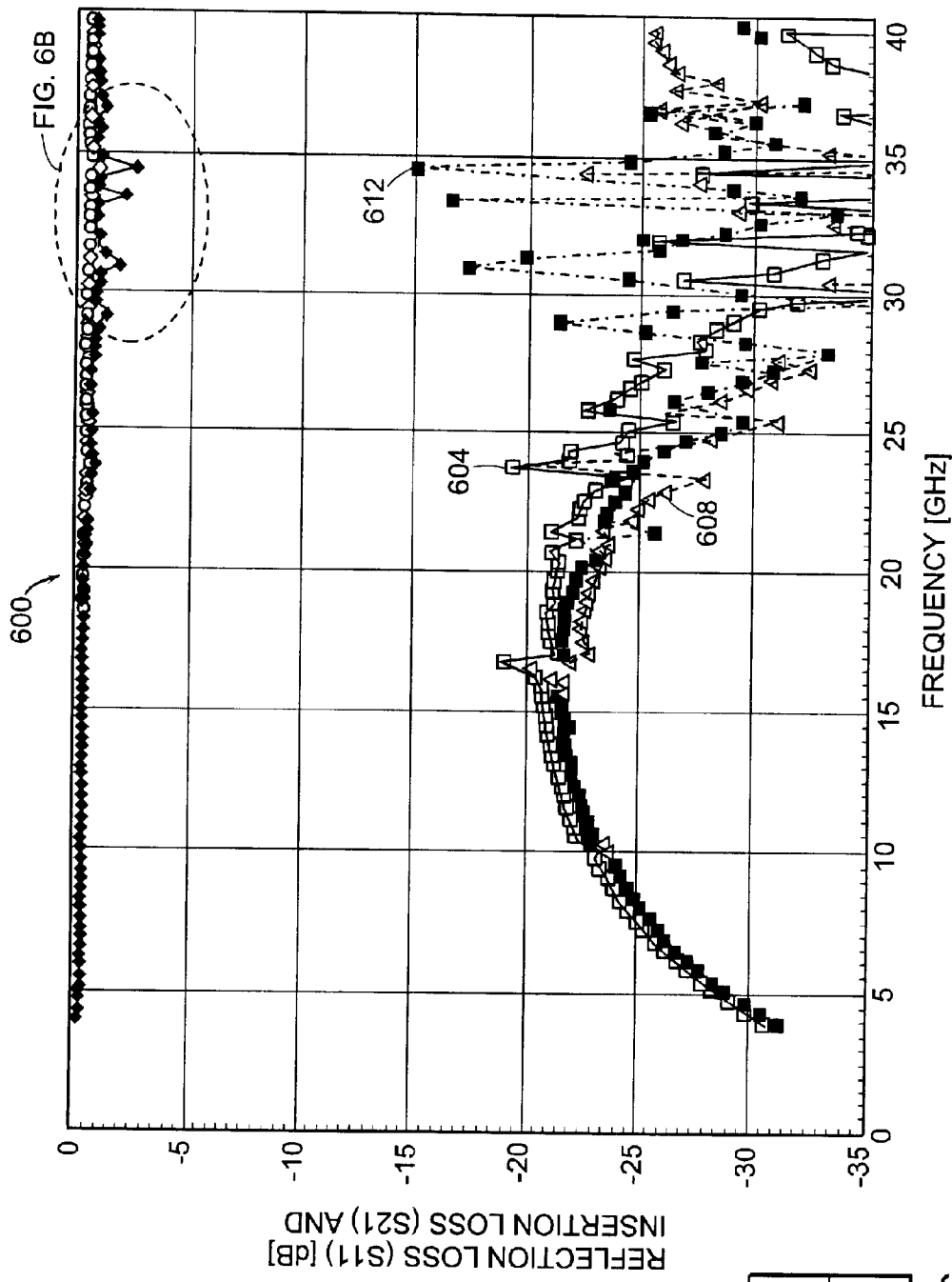
FIGS. 6A and 6B graphically illustrate S-parameters for a floating electrode modulator having non-segmented electrically grounded electrodes and for two floating electrode modulators having segmented electrically grounded electrodes according to the present invention.
Figure 6:
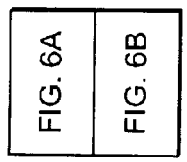
Figure 6B:
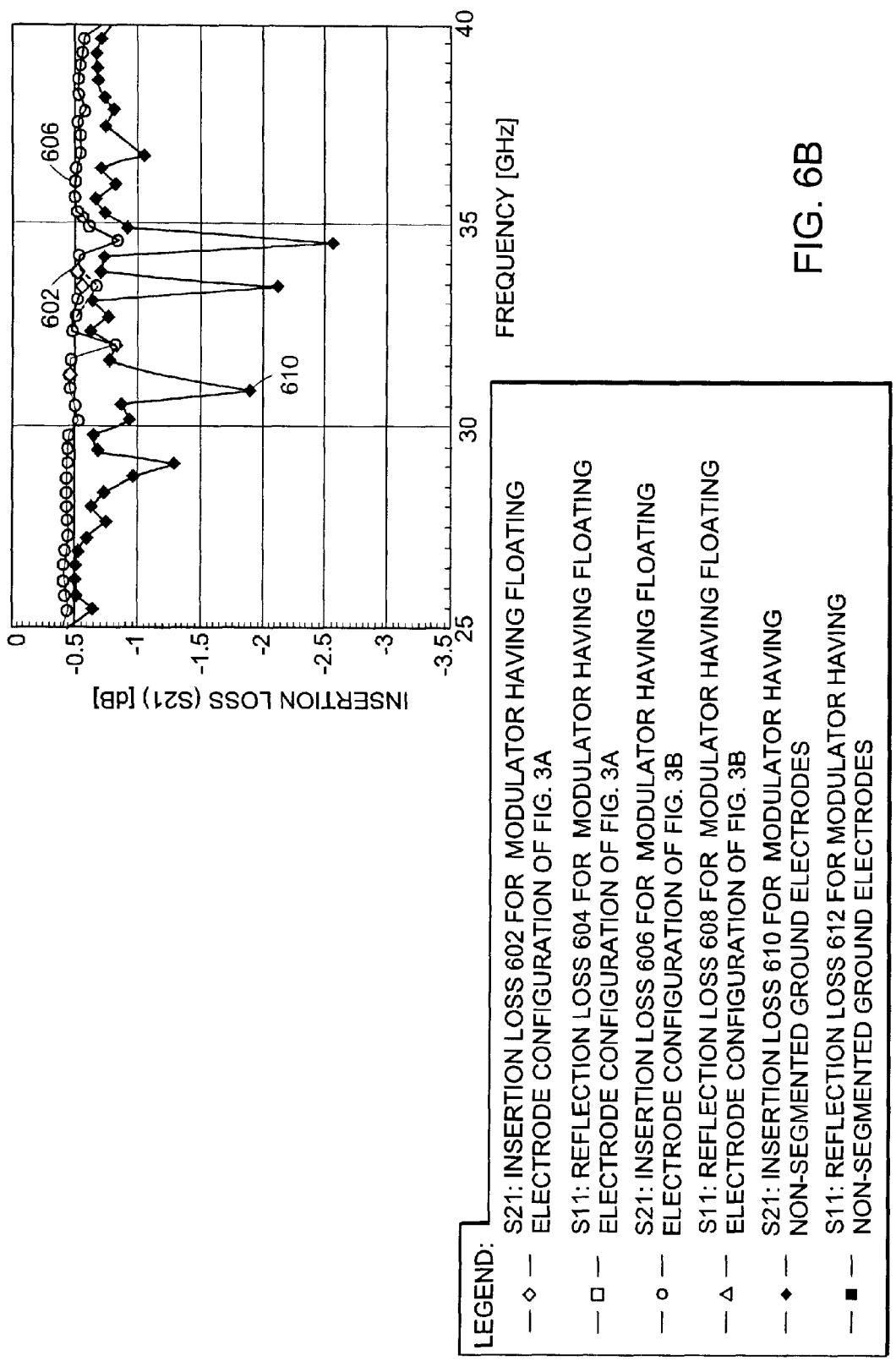

FIGS. 6A and 6B graphically illustrate S-parameters 600 for a typical floating electrode modulator having non-segmented electrically grounded electrodes and for two floating electrode modulators having segmented electrically grounded electrodes according to the present invention. Specifically, FIGS. 6A and 6B illustrate the insertion loss characteristics (s21) 602 and the reflection loss characteristics (s11) 604 in decibels as a function of frequency for a floating electrode modulator 100 having the electrode configuration 300 that was described in connection with FIG. 3A. As described herein, the electrode configuration 300 of FIG. 3A includes electrically floating electrode segments 206a–i that are aligned coincident with corresponding electrically grounded electrode segments 208a–i, 210a–i.

FIGS. 6A and 6B also illustrates the insertion loss (s21) characteristics 606 and the reflection loss characteristics (s11) 608 in decibels as a function of frequency for the floating electrode modulator 100 having the electrode configuration 300' that was described in connection with FIG. 3B. For comparison, FIGS. 6A and 6B also illustrate the insertion loss characteristics (s21) 610 and the reflection loss characteristics (s11) 612 in decibels as a function of frequency for a typical modulator having non-segmented ground electrodes. As described herein, the electrode configuration 300 of FIG. 3B includes electrically floating electrode segments 206a–i that are offset from the electrically grounded electrode segments 208a–j, 210a–j.

The insertion loss characteristics (s21) 602, 606 and the reflection loss characteristics (s11) 604, 608 indicate that high frequency resonance is reduced or suppressed in the modulators having the floating electrode configurations 300, 300', respectively, according to the present invention when compared to the insertion loss characteristics (s21) 610 and the reflection loss characteristics (s11) 612 of a typical modulator having non-segmented electrically grounded electrodes. Thus, improved performance beyond 25 GHz is observed in the floating electrode modulators 100 having the floating electrode configurations 300, 300' according to the present invention.

EQUIVALENTS

While the invention has been particularly shown and described with reference to specific embodiments, it should be understood by those skilled in the art that various changes in form and detail may be made therein without departing from the spirit and scope of the invention

What is claimed is:

1. An electro-optic device comprising:
   a substrate including an optical waveguide formed in an upper surface thereof;
   a plurality of electrically floating electrode segments that are positioned on the substrate to intensify an electric field in the optical waveguide;
   a plurality of electrically grounded electrode segments that are positioned on the substrate so that each of the plurality of electrically grounded electrode segments are separated from an adjacent one of the plurality of electrically grounded electrode segments by a predetermined distance, the plurality of electrically grounded electrode segments suppressing modal conversion and propagation or high order modes in the plurality of electrically grounded electrode segments and the plurality of electrically floating electrode segments, thereby suppressing modal coupling to the substrate that reduces high frequency loss in the substrate;
   a buffer layer formed on the substrate, the plurality of electrically floating electrode segments, and the plurality of electrically grounded electrode segments; and
   a driving electrode that is formed on the buffer layer, the driving electrode being adapted to receive an RF signal that induces the electric field in the optical waveguide.

2. The device of claim 1 wherein the electrically grounded electrode segments substantially prohibit modal conversion and propagation of high order modes including one or more substrate modes in the plurality of electrically grounded electrode segments and the plurality of electrically floating electrode segments by suppressing modal resonance and introducing cutoff to the one or more substrate modes.

3. The device of claim 1 wherein the plurality of electrically grounded electrode segments reduce high frequency loss in the substrate due to modal coupling by suppressing modal resonance and introducing cutoff to the one or more substrate modes.

4. The device of claim 1 wherein the electro-optic device comprises a Mach-Zehnder interferometric modulator.

5. The device of claim 1 wherein the substrate comprises a X-cut lithium niobate substrate.

6. The device of claim 1 wherein the substrate comprises a Z-cut lithium niobate substrate.

7. The device of claim 1 wherein the predetermined distance is chosen so as to suppress modal coupling to the substrate and propagation of higher order modes including one or more substrate modes in the plurality of electrically grounded electrode segments and the plurality of electrically floating electrode segments.

8. The device of claim 1 wherein the predetermined distance is chosen so as increase suppression of modal coupling to the substrate.

9. The device of claim 1 wherein the buffer layer has a thickness of less than ten microns.

10. The device of claim 1 wherein the buffer layer comprises a dielectric material.

11. The device of claim 10 wherein the dielectric material comprises BCB dielectric material.

12. The device of claim 10 wherein the dielectric material comprises $SiO_2$ dielectric material.

13. The device of claim 10 wherein the dielectric material comprises $TF_4$ dielectric material.

14. The device of claim 1 wherein the buffer layer comprises a semiconductor material.

15. A method for suppressing modal coupling to a substrate of an electro-optic device comprising:
   inducing an electric field in an optical waveguide by applying an RF signal to a driving electrode;
   intensifying the electric field in the optical waveguide by positioning a plurality of electrically floating electrode segments and a plurality of electrically grounded electrode segments proximate to the optical waveguide so that each of the plurality of electrically grounded electrode segments are separated from an adjacent one of the plurality of electrically grounded electrode segments by a predetermined distance; and
   interrupting continuity of induced electrical current in the plurality of electrically grounded electrode segments, thereby substantially prohibiting modal conversion and propagation of high order modes in the plurality of electrically grounded electrode segments and the plurality of electrically floating electrode segments.

16. The method of claim 15 wherein the interrupting of continuity of induced electrical current in the plurality of electrically grounded electrode segments reduces insertion loss in the electro-optic device by suppressing modal coupling to the substrate.

17. The method of claim 15 wherein the interrupting of continuity of induced electrical current in the plurality of electrically grounded electrode segments comprises positioning the plurality of electrically grounded electrode segments proximate to the plurality of electrically floating electrode segments.

18. The method of claim 15 wherein the predetermined distance is chosen so as to substantially prohibit modal conversion and propagation of higher order modes including one or more substrate modes in the plurality of electrically grounded electrode segments and the plurality of electrically floating electrode segments.

19. The method of claim 15 wherein the predetermined distance is chosen so as increase suppression of modal coupling to the substrate.

20. The method of claim 15 further comprising positioning at least one of the plurality of electrically grounded electrode segments a distance from an adjacent one of the plurality of electrically grounded electrode segments so as to substantially prohibit modal conversion and propagation of high order modes including one or more substrate modes in the plurality of electrically grounded electrode segments and the plurality of electrically floating electrode segments.

21. The method of claim 15 further comprising positioning at least one of the plurality of electrically grounded electrode segments a distance from an adjacent one of the plurality of electrically grounded electrode segments so as to increase suppression of modal coupling to the substrate.

22. An electro-optic device comprising:

means for inducing an electric field in an optical waveguide formed in a substrate;

means for intensifying the electric field in the optical waveguide with a plurality of electrically floating electrode segments and a plurality of electrically grounded electrode segments so that each of the plurality of electrically grounded electrode segments are separated from an adjacent one of the plurality of electrically grounded electrode segments by a predetermined distance; and means for interrupting continuity of induced electrical current in the electrically grounded electrode segments, thereby substantially prohibiting modal conversion and propagation of high order modes in the plurality of electrically grounded electrode segments and the plurality of electrically floating electrode segments.

23. An electro-optic modulator comprising:

a substrate including a first and a second optical waveguide that form an interferometer in an upper surface of the substrate;

a plurality of electrically floating electrode segments that are positioned on the substrate to intensify an electric field in the first and the second optical waveguides;

a plurality of electrically grounded electrode segments that are positioned on the substrate so that each of the plurality of electrically grounded electrode segments are separated from an adjacent one of the plurality of electrically grounded electrode segments by a predetermined distance, the plurality of electrically grounded electrode segments substantially prohibiting modal conversion and propagation of high order modes in the plurality of electrically grounded electrode segments and the plurality of electrically floating electrode segments, thereby suppressing modal coupling to the substrate;

a buffer layer formed on the substrate, the plurality of electrically floating electrode segments, and the plurality of electrically grounded electrode segments; and a driving electrode that is formed on the buffer layer, the driving electrode adapted to receive an RF signal from an RF input, the RF signal inducing the electric field in the first and the second optical waveguides.

24. The electro-optic modulator of claim 23 wherein the predetermined distance is chosen so as to substantially prohibit modal conversion and propagation of higher order modes including one or more substrate modes in the plurality of electrically grounded electrode segments and the plurality of electrically floating electrode segments.

25. The electro-optic modulator of claim 23 wherein the predetermined distance is chosen so as increase suppression of modal coupling to the substrate.

26. The electro-optic modulator of claim 23 wherein the buffer layer comprises a dielectric material.

* * * * *